(12) United States Patent
Vyskocil et al.

(10) Patent No.: US 9,956,539 B2
(45) Date of Patent: May 1, 2018

(54) APPARATUS FOR LOCATION-INDEPENDENT TREATMENT OF BIOMASS

(71) Applicant: AVA-CO2 Schweiz AG, Zug (CH)

(72) Inventors: Jan Vyskocil, Zug (CH); Stepan Kusche, Karlsruhe (DE)

(73) Assignee: AVA-CO2 Schweiz AG, Zug (CH)

( * ) Notice: Subject to any disclaimer, the term of this patent is extended or adjusted under 35 U.S.C. 154(b) by 536 days.

(21) Appl. No.: 14/659,777

(22) Filed: Mar. 17, 2015

(65) Prior Publication Data

US 2015/0266001 A1  Sep. 24, 2015

(30) Foreign Application Priority Data

Mar. 18, 2014 (DE) .................. 10 2014 103 704

(51) Int. Cl.
| | |
|---|---|
| A61L 2/00 | (2006.01) |
| F26B 3/34 | (2006.01) |
| F26B 19/00 | (2006.01) |
| B01J 19/24 | (2006.01) |
| C10L 9/08 | (2006.01) |

(52) U.S. Cl.
CPC .............. *B01J 19/24* (2013.01); *C10L 9/086* (2013.01); *B01J 2219/0002* (2013.01); *B01J 2219/2401* (2013.01); *Y02E 50/10* (2013.01); *Y02E 50/30* (2013.01)

(58) Field of Classification Search
CPC ................ B01J 19/24; B01J 2219/0002; B01J 2219/2401
USPC ........... 422/292, 295, 300, 307; 34/247, 549
See application file for complete search history.

(56) References Cited

U.S. PATENT DOCUMENTS

| | | | |
|---|---|---|---|
| 2012/0000120 A1* | 1/2012 | Stark ..................... | B01J 3/04 44/605 |
| 2013/0145940 A1* | 6/2013 | Roberge ................ | A01F 15/02 100/100 |

* cited by examiner

Primary Examiner — Monzer R Chorbaji
(74) Attorney, Agent, or Firm — Collard & Roe, P.C.

(57) ABSTRACT

Within the scope of hydrothermal carbonization, biomass is converted to bio-coal and other products. Because biomass occurs at irregular intervals at different locations and also, in part, only individual method steps are required at different locations, however, an apparatus for treatment of biomass is integrated into a variable, mobile container, and mobile containers adapted to the individual steps of the method are provided, which can be transported in compact manner and can be adapted, in terms of size, in the setup situation. This arrangement allows effective equipping of the individual containers, which can be expanded into a setup situation on location.

16 Claims, 2 Drawing Sheets

APPARATUS FOR LOCATION-INDEPENDENT TREATMENT OF BIOMASS

CROSS REFERENCE TO RELATED APPLICATIONS

Applicant claims priority under 35 U.S.C. § 119 of German Application No. 10 2014 103 704.9 filed Mar. 18, 2014, the disclosure of which is incorporated by reference.

BACKGROUND OF THE INVENTION

1. Field of the Invention

The present invention relates to an apparatus for location-independent treatment of biomass.

2. Description of the Related Art

The method of hydrothermal carbonization represents an efficient way to utilize biomass, particularly for the production of bio-coal and other products that occur within the scope of hydrothermal carbonization. In this connection, the carbonization process takes place in a reaction vessel, with the addition of steam, wherein predetermined ambient parameters must be set in the interior of the reaction vessel. For example, it is necessary to work at an elevated temperature and a clearly elevated pressure, so that the carbonization reaction can take place completely and in energy-efficient manner.

For batch operation of a facility for carrying out hydrothermal carbonization, generally at least one pretreatment tank and one reaction vessel are required. If necessary a cooling vessel is also provided into which the biomass is conveyed after completion of hydrothermal carbonization and in which it can cool. On the basis of the ambient conditions that must be created in the vessels, it is necessary to keep the vessels on hand in a specific size, so that a specific throughput of a facility can also be achieved, particularly on the basis of the desired batch operation. This requirement, however, more or less defines such a facility spatially, so that it is necessary to regularly pick up the biomass where it occurs, and, if necessary, to bring the resulting product back to the producer.

It is problematical, in this connection, that the biomass can change, depending on its type, during a waiting time or as a result of transport, particularly if fermentation processes set in. Furthermore, the effort for driving biomass to a facility for hydrothermal carbonization that might lie at a distance frequently appears to be too great. Up to the present, however, nationwide provision of hydrothermal carbonization facilities does not exist, by far, so that the currently existing capacity utilization possibilities for the use of biomass are hardly sufficiently used at this time.

It could represent a solution for such a problem to configure a hydrothermal carbonization facility in mobile manner, in order to use it on location for a period of time and then, after the biomass that occurs in the immediate surroundings has been delivered, to move it to another location and set it up there again. This configuration, however, appears to be difficult because of the spatial requirements of the devices and vessels needed to carry out hydrothermal carbonization, because they can assume only small dimensions on the basis of the predetermined container sizes in mobile applications.

SUMMARY OF THE INVENTION

Against this background, the present invention is based on the task of providing an apparatus for location-independent treatment of biomass, which solves the aforementioned problems and offers the greatest possible variability and adaptability together with great mobility.

This task is accomplished by means of an apparatus for location-independent treatment of biomass in accordance with the invention. Further practical embodiments of such an apparatus are discussed below.

According to the invention, it is provided to accommodate an apparatus for location-independent treatment of biomass in a mobile container, wherein this container in turn is variably configured. In this connection, the container is enclosed by a plurality of wall elements that can be displaced relative to one another, at least in part, or can be rotated about an axis of rotation, so that the different walls of the mobile container can be put together to form a structural expansion of the mobile container by means of pushing them out and folding them out. As a result, a clearly enlarged enclosed space is formed by pushing individual wall elements out and folding them out, which elements can also be disposed in the floor region or ceiling region of a container, which space can either be supplemented with additional wall elements or, alternatively, be closed by means of unfolding wall elements structured in multiple layers. In this connection, wall elements having multiple layers can easily be enlarged by means of displacing the individual wall elements relative to one another, or can also be provided with axes of rotation disposed at the edges, so that two wall layers that lie on top of one another, over their full area, can be set at an angle relative to one another by means of reciprocal rotation.

In this way, a container that is clearly increased in size as compared with a normal container is obtained, so that it is possible to assign a significantly larger space to the vessels, devices, and machines that are brought along. Furthermore, the vessels can be brought into a transport position, from which they are pivoted out into a setup position, set up, and expanded, so that the dimensions of the vessels and equipment used can easily exceed the original dimensions of the container.

It is also possible to insert individual devices, vessels or machines into housing parts that are accommodated in a container. These housing parts can then be pushed out of the interior of the housing by pushing them through a wall opening, for example, but thereby form a part of the outer wall of the mobile container, which part has also only been increased in size, if applicable. In particular, it is also easily possible to distribute vessels and devices among multiple containers, which can then be adapted to different tasks and can be connected with one another, if necessary.

For such a connection among containers, each container can have first supply and/or pass-through connectors that lie on the outside, which connectors are provided for steam and/or electricity and/or water, for example. These first connectors that lie on the outside are passed through the container to another wall, for example an opposite wall of the container, where the connectors end in second supply and/or pass-through connectors that lie on the outside. In this manner, through-connecting of the supply connectors from one container to the next is easily possible, even independent of the position of the containers relative to one another, in each instance. To the extent that the lines, in each instance, are also needed within the container, these lines are tapped along lines that run within the container and passed to the vessels, devices, and machines in question.

In this connection, the individual lines can be combined on connector plates or, in general, connector means at the outside walls, in each instance, so that the connection lines to be used between the individual mobile containers in turn possess only one or a few common plugs. For example, a steam line, an electricity line, and a water line can simultaneously be disposed on one plug, so that a complete connection between two mobile containers can be produced quickly and easily with one line.

Fundamentally, different configurations of the individual containers are provided. For example, the pressure vessel can be a reaction vessel in a first container, which vessel is intended and set up for carrying out a hydrothermal carbonization reaction. A pretreatment tank can then be assigned to the reaction vessel, with the interposition of a conveying device, in which tank the biomass is homogenized and hygienized in a pretreatment step. In this connection, the pretreatment tank can be disposed in the same container, or can also be accommodated in an additional container.

Likewise, however, it is also possible to accommodate only one pretreatment tank in a container, which tank is filled with biomass that is homogenized and hygienized in a pretreatment step. The resulting slurry is then brought into a transport vessel and transported to a hydrothermal carbonization facility that might lie at a distance. This arrangement has the advantage that a further change in the biomass on location does not take place, that the first treatment of the biomass would therefore be performed on location, and further treatment, if necessary, is carried out centrally at a different location.

Because the pretreatment tank can be filled with the most varied kinds of biomass, different feed devices can be assigned to the tank. For example, a shredder having a feed means, for example a conveyor belt, can be assigned to the pretreatment tank, by way of which means the biomass is brought into the pretreatment tank. Nevertheless, pumping in biomass by way of a feed pump or also introduction by way of a conveying screw is easily possible within the scope of the invention. This possibility furthermore increases the variability and flexibility of the arrangement proposed here.

Supplemental to the pretreatment tank, a cooling vessel, which in turn is set up either in the same or in an additional mobile container, can also be assigned to the pressure vessel. Because a clear temperature increase also occurs during the pretreatment, and also, the work is carried out at an elevated pressure, the cooling vessel can be assigned both to a pretreatment tank and to a reaction vessel, in this connection. In the cooling vessel, for one thing the temperature of the biomass, in other words the slurry, is lowered, and for another, the pressure application is slowly reduced. In this connection, the cooling vessel can have a cooling mantle through which medium flows, for example, which mantle is cooled with thermal oil, for example. In this connection, the thermal oil absorbs heat from the cooling vessel during the course of the cooling process and conducts it away.

Furthermore, a drying apparatus can follow the cooling vessel, whereby it is particularly advantageous if this drying apparatus is a heated or an unheated chamber filter press. The cooled biomass is disposed between pressing plates in the chamber filter press, whereby liquid still contained in the biomass is separated during the pressing process, using membranes. In the case of a heated chamber filter press, both the medium as such and also the pressing plates can be heated, in order to further accelerate the drying process in this way. To the extent that it is present, the cooling medium of a cooling vessel, which medium was heated during the cooling process, can be used for heating the medium or also the pressing plates of the chamber filter press, for example.

From safety aspects, at least the container having the reaction vessel and/or the chamber filter press should have an air exhaust system assigned to it, so that a partial vacuum can be produced in the mobile container, using this system. Vapors, harmful substances and the like that occur are thereby immediately drawn off; even in the event of a malfunction, it is possible to ensure that adverse effects on persons are prevented, using the air exhaust system.

The process water that particularly occurs during the course of cooling and drying of the slurry can be passed to an additional process water treatment unit, to some advantage, which system can also be accommodated in an additional mobile container, for example. Further devices, for example a mobile steam generator, can also be additionally provided as separate devices or separate containers, depending on the spatial expenditure that occurs for this. Any desired practical combination of device can easily be brought together in a container, which, as described initially, can be variably adapted in terms of its outside dimensions, in this connection.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
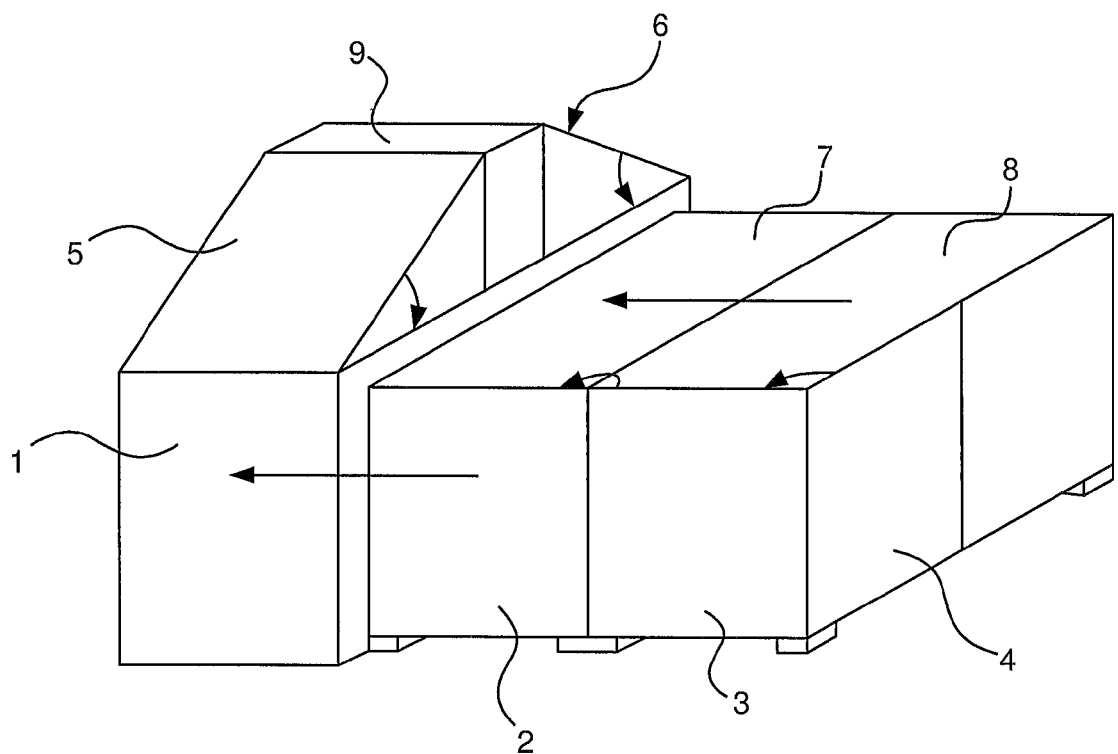
FIG. 1 is a perspective representation of a mobile container having a plurality of wall elements, which increase the size of the external dimensions of the container, in an unfolded state.

FIG. 1 shows a container 1 that can be set up on location, as needed, using a truck, wherever there is a need for disposing of biomass using a hydrothermal carbonization facility. The container 1 can be variably structured, in such a manner that it has different foldable and/or displaceable wall elements 2 to 8, which make it possible to clearly increase the size of the spatially restricted container 1. For example, the container 1 first of all has a push wall 2, which can be pushed out of the container interior toward the side. A first folding wall 3 is pushed out of this push wall 2; a second folding wall 4 had been folded onto the former. In the situation shown, the container 1 has been completely unfolded, so that the arrows in FIG. 1 indicate a folding or pushing direction in which the walls 2, to 8 in question can be moved back into the container 1. By folding the second folding wall 4 against the first folding wall 3, and subsequently folding the first folding wall 3, which has thereby been doubled in size, against the push wall 2, two walls at once are integrated into a third wall or laid against it. This push wall 2, which has thereby been tripled, can then be pushed into the container 1 in the direction of the arrow indicated. First and second push floors 7 and 8 that can be pushed into one another can also be stowed away by means of reciprocal displacement and ultimately overall displacement into the container 1. The same holds true analogously for the opposite side of the container 1 and the floor.

The height of the container 1 can also be increased in size by means of unfolding a first folding roof 5 and a second folding roof 6 about a specific angle, so that a higher device can be accommodated in the center of the container, in particular. The distance between the first folding roof 5 and the second folding roof 6 that results from this arrangement can be closed off by means of an intermediate piece 9, which in turn can be folded out of the folded roofs 5 or 6 or, alternatively, can be carried along loose in the container 1 and used as needed.

On the basis of this changeability of the container 1, it is now possible to fill it more or less completely with equipment to be used, at first, before it is put into operation, and to remove the devices, vessels, and the like to be used from the container 1 when it is being set up on location, and to distribute them in the resulting, completely set up container 1 in suitable manner.

Figure 2:
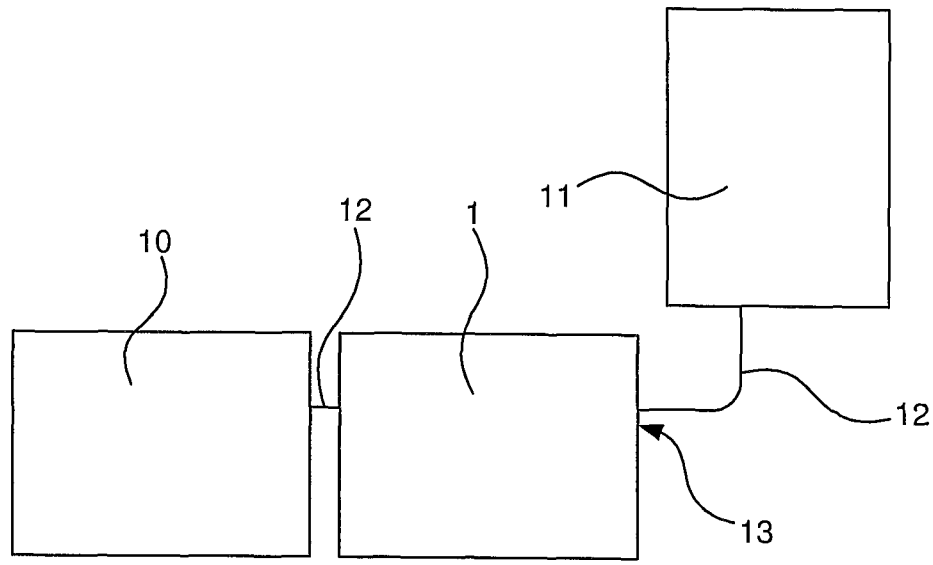
FIG. 2 is a top view from above of a plurality of mobile containers that have been joined together to form an overall facility.
Figure 3:
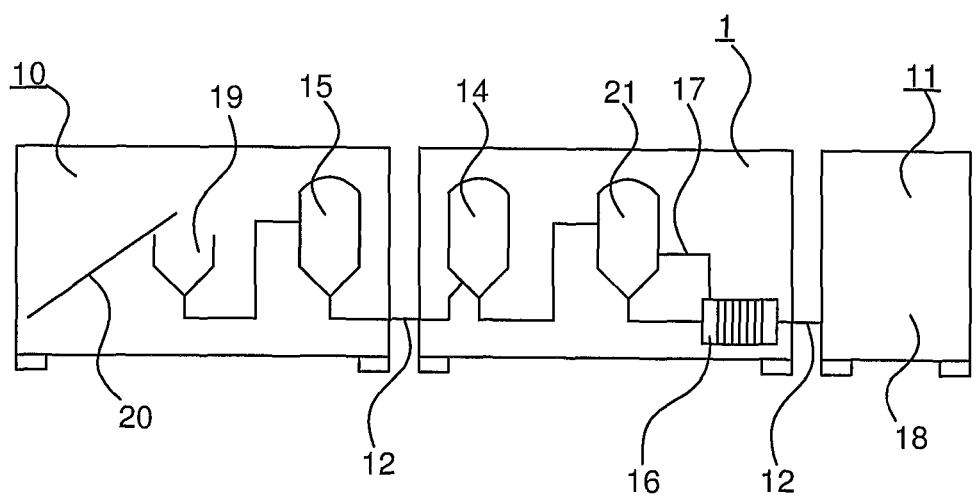
FIG. 3 is a lateral sectional representation of the mobile containers according to FIG. 2.

FIG. 2 shows a mobile arrangement of multiple containers 1, 10, and 11, wherein an explicit representation of the unfolding process has been left out in the representation of FIGS. 2 and 3. In this connection, first a first container 1 is provided, which has connector plates 13 on the outside, on an opposite site, by way of which plates connections for water, steam, and electricity, for example, are passed to the outside. Using connection lines 12, in this way the container 1 is connected with adjacent containers 10 and 11, whereby the container 10 is a feed container and the container 11 is a process water container.

FIG. 3 describes the function of the individual containers 1, 10, and 11 in greater detail. Thus, in the present example a reaction vessel 14 in which the hydrothermal carbonization reaction takes place is at first disposed in the first container 1. The slurry removed from the reaction vessel 14 is brought to the cooling vessel 21, which is surrounded by a cooling mantle through which medium flows, by way of a corresponding connection. Slurry exiting from the cooling vessel 21 is then brought into a chamber filter press 16 that separates the process water from the biomass. This chamber filter press 16 is heated for acceleration of the drying process, and heated with the medium from the cooling mantle of the cooling vessel 21, which medium is passed to the chamber filter press 16 by way of a thermal oil line 17. The process water that exits from the slurry during pressing is passed to a process water treatment unit 18, which is disposed in the process water container 11 in a manner that is of no further interest, through a connection line 12.

The reaction vessel 14 is fed from a pretreatment tank 15 that is disposed in the feed container 10. Homogenization and hygienization of the biomass take place in the pretreatment tank 15; in the present example, it is first fed to a shredder 19 by way of feed means 20, here in the form of a conveyor belt, and the shredder then introduces the shredded biomass into the pretreatment tank 15. Homogenization and hygienization then take place in the pretreatment tank, with steam being mixed in and pressure and a corresponding temperature being applied.

Therefore an apparatus for location-independent treatment of biomass has been described above, which allows equipping variably configured containers with the required vessels, devices, and machines, in each instance, in order to be able to perform the required method parts of a hydrothermal carbonization method, in each instance, on location, and, as necessary, to relocate carrying out other parts of the hydrothermal carbonization method to other locations.

Although only a few embodiments of the present invention have been shown and described, it is to be understood that many changes and modifications may be made thereunto without departing from the spirit and scope of the invention.

What is claimed is:

1. An apparatus for location-independent treatment of a biomass comprising:
    (a) a mobile container having a pressure vessel for accommodation of the biomass; and
    (b) a plurality of wall elements enclosing the mobile container;
    wherein the pressure vessel is a reaction vessel for carrying out a hydrothermal carbonization reaction;
    wherein the wall elements are rotatable about at least one axis of rotation or are moveable outwards in at least one push direction from a transport position to a setup position achieved via rotation or outward movement; and
    wherein the wall elements in the setup position enclose a setup volume, the wall elements in the transport position enclose a transport volume, and the setup volume is larger than the transport volume.

2. The apparatus according to claim 1, wherein the at least one axis of rotation is disposed at an edge of the wall elements, wherein the wall elements are structured to be multi-layered in the transport position to form multiple wall layers that lie on top of one another in the transport position, and wherein the multiple wall layers are displaceable relative to one another or are rotatable relative to one another about the at least one axis of rotation disposed at the edge.

3. The apparatus according to claim 1, wherein devices accommodated in the mobile container are enclosed by a housing part that is displaceable from the transport position into the setup position and that forms a part of an outer wall of the mobile container, at least in the setup position.

4. The apparatus according to claim 1, wherein the mobile container has a first set of connectors comprising at least one of first supply connectors and pass-through connectors that lie outside the mobile container for a passed-through material comprising at least one of steam, electricity, and water, wherein the first set of connectors extend to a corresponding second set of connectors comprising at least one of second supply connectors and pass-through connectors on another container wall, and wherein at least one of supply and pass-through lines are disposed within the container and are tapped between the first and the second sets of connectors.

5. The apparatus according to claim 4, wherein the first and second sets of connectors are combined on a common connector plate, wherein different connection lines to be connected with said connector plate end in a common plug.

6. The apparatus according to claim 1, wherein a pretreatment tank for homogenization and hygienization of the biomass is assigned to the reaction vessel, with the interposition of a conveying device, and wherein the tank is disposed in the mobile container or in a separate further mobile container.

7. The apparatus according to claim 6, wherein at least one of a shredder and a feed device for feeding in the biomass in a raw state is assigned to the pretreatment tank in the mobile container or to a pretreatment tank in an additional mobile container.

8. The apparatus according to claim 1, wherein the pressure vessel has a cooling vessel assigned to the pressure vessel in the mobile container or in an additional mobile container.

9. The apparatus according to claim 8, wherein the cooling vessel has a cooling mantle through which medium flows.

10. The apparatus according to claim 8, wherein the cooling vessel is followed by a drying apparatus.

11. The apparatus according to claim 10, wherein the drying apparatus is a heated chamber filter press or an unheated chamber filter press.

12. The apparatus according to claim 10, wherein the drying apparatus is a heated chamber filter press and is heated with coolant of the cooling vessel.

13. The apparatus according to claim 1, wherein the mobile container has an air exhaust system assigned to the mobile container for producing a partial vacuum in the mobile container.

14. The apparatus according to claim 1, wherein a process water treatment unit is disposed in the mobile container or in an additional mobile container.

15. The apparatus according to claim 1, wherein a mobile steam generator is disposed in the mobile container or in an additional mobile container.

16. An apparatus for location-independent treatment of a biomass comprising:
(a) a mobile container having a pressure vessel for accommodation of the biomass; and
(b) a plurality of wall elements enclosing the mobile container;
wherein the pressure vessel is a pretreatment tank for homogenization and hygienization of the biomass;
wherein the wall elements are rotatable about at least one axis of rotation or are moveable outwards in at least one push direction from a transport position to a setup position achieved via rotation or outward movement; and
wherein the wall elements in the setup position enclose a setup volume, the wall elements in the transport position enclose a transport volume, and the setup volume is larger than the transport volume.

* * * * *